United States Patent [19]

Lakatos et al.

[11] 4,218,341

[45] Aug. 19, 1980

[54] PROCESS FOR THE APPLICATION OF A CATALYTICALLY ACTIVE COATING ON A CATALYST CARRIER

[75] Inventors: Eduard Lakatos, Rheinfelden; Edgar Koberstein, Alzenau; Jörg Hensel, Hanau; Alfred Bozon, Erlensee, all of Fed. Rep. of Germany

[73] Assignee: Deutsche Gold- und Silber-Scheideanstalt vormals Roessler, Frankfurt, Fed. Rep. of Germany

[21] Appl. No.: 868,017

[22] Filed: Jan. 9, 1978

Related U.S. Application Data

[63] Continuation of Ser. No. 703,332, Jul. 8, 1976, abandoned.

[30] Foreign Application Priority Data

Jul. 16, 1975 [DE] Fed. Rep. of Germany ....... 2531770

[51] Int. Cl.$^2$ ............................................. B01J 23/08
[52] U.S. Cl. .................................... 252/430; 252/441; 252/463; 252/461; 252/477 R; 252/466 PT

[58] Field of Search ...................... 427/243, 244, 333; 252/463, 465, 441, 466 PT, 477 R, 430

[56] References Cited

U.S. PATENT DOCUMENTS

| 2,746,936 | 5/1956 | Plank | 252/465 |
| 3,985,682 | 10/1976 | Cull | 252/463 |

Primary Examiner—Sam Silverberg
Attorney, Agent, or Firm—Beveridge, DeGrandi, Kline & Lunsford

[57] ABSTRACT

An improved process for applying a coating or film of at least one catalytically active element to the external surface of a porous catalyst carrier having a large surface area by contacting said catalyst carrier with a solution of said at least one catalytically active element, wherein the improvement comprises:

(1). Contacting said catalyst carrier with an organic liquid, wherein the saturation of said catalyst carrier is not exceeded;

(2). Adding a solution of said at least one catalytically active element to said catalyst carrier; and (3). Heating said catalyst carrier to remove liquid therefrom.

8 Claims, No Drawings

PROCESS FOR THE APPLICATION OF A CATALYTICALLY ACTIVE COATING ON A CATALYST CARRIER

This is a continuation of application Ser. No. 703,332 filed July 8, 1976.

This invention relates to a process for the application of a coating or film of catalytically active elements from solutions thereof to the outside surface of a porous, catalyst carrier having a large surface area.

Catalyst supports, also called structural reinforcing agents, are substances having large surface areas on which catalytically active substances can be precipitated in thin layers. Since catalytic reactions take place at the surface of such carriers, the catalytic effect is increased and valuable catalytically active substance is saved by retarding the penetration of the catalytically active substances into the carrier.

It is known in the art that porous, pellet-type catalyst supports can be sprayed with a concentrated aqueous salt solution of catalytically active components. The amount of water in the solution is less than the absorptive capacity of the carrier. The carrier is calcined after spraying. Optionally, spraying can be conducted at elevated temperature. When necessary, the absorption is facilitated by evacuation of the catalyst carrier.

Another known process for the application of catalytically active substances is the vapour phase impregnation method, in which hot butane containing $AlCl_3$ is led over the catalyst body, and the $AlCl_3$ is precipitated on the body.

It is also known that platinum salts can be dissolved in methanol, acetone, methyl acetate or similar solvents. The catalyst carrier can be impregnated with the resulting solution, and then ignited. A chemical reduction of the platinum takes place. (British Pat. No. 496,579 Baker & Co.). According to another known process, platinum salts are dissolved in a high boiling point oil, for example, fish oil (boiling point over 250° C.). This solution is applied to the catalyst carrier at a depth of penetration of a maximum of 1 mm, and the oil is subsequently removed by heating, whereby it ignites (British Pat. No. 594,463 Baker & Co.).

These processes are disadvantages because one must work with closed containers. A uniform coating of the active substance on the catalyst carrier is not assured, as a result of which catalysts of variable quality will be obtained. A further disadvantage is the high loss of catalytically active components.

There exists a need in the art for a process for the surface coating of catalyst carriers, which will avoid these disadvantages. The process should be capable of producing a product in which the catalytically active coating does not penetrate the carrier too deeply.

SUMMARY OF THE INVENTION

Accordingly, this invention aids in fulfilling these needs in the art by providing an improved process for applying a coating or film of at least one catalytically active element to the external surface of a porous catalyst carrier having a large surface area by contacting the catalyst carrier with a solution of the catalytically active element, wherein the improvement comprises:
(1) contacting the catalyst carrier with an organic liquid, wherein the saturation of the catalyst carrier is not exceeded;
(2) adding a solution of the at least one catalytically active element to the catalyst carrier; and
(3) heating the catalyst carrier to remove liquid therefrom.

To the organic liquid in step (1) above one can optionally add a solution of complexing agent, a precipitation agent, a reducing agent, or mixtures of these substances. In another optional embodiment, the catalyst carrier obtained from step (3) above can be subjected to an after-treatment.

This invention also provides a catalyst prepared according to the process of this invention wherein the catalyst carrier has a catalytically active coating which penetrates into the carrier to a maximum depth of about 0.4 mm.

DETAILED DESCRIPTION

In carrying out the process of this invention, the catalyst carrier can be contacted with a non-combustible, organic liquid, such as $CCl_4$. In a preferred variation of the process of this invention, the catalyst carrier is contacted with a combustible, organic liquid, wherein the saturation of the catalyst carrier is not exceeded, optionally adding complexing, precipitating, reducing agents or mixtures thereof dissolved in a combustible organic liquid. The catalytically active elements can then be added in a quantity of solvent which does not impair the combustibility of the organic liquid. The organic liquid is subsequently deflagrated, and the catalyst carrier thus treated can optionally be subjected to an after-treatment.

The process of this invention can be carried out on a granulating plate or by means of a drageé-machine. The device employed can optionally be fitted with heating means. The deflagration time of the organic liquid can be controlled by means of the rotational speed of the container in which the process ingredients are placed. After deflagration of the organic liquid, the catalyst carrier can be treated with a reducing agent as an after-treatment. For example, this can be achieved by treating the catalyst carrier with a flow of hydrogen for a period of time, such as ½ to 3 hours, at an elevated temperature, which can be set up to about 600° C. Forming gas, formaldehyde, carbon monoxide, hydrazine, hydroxyl amine, glyoxal and sulfur dioxide are typical examples of other reducing agents that can be employed in this invention. The completion of the reducing step can be determined by a separate activity test.

An optional variation of the after-treatment comprises tempering the catalyst carrier at elevated temperature, which likewise can be up to about 600° C.

The catalyst carrier employed in this invention is a substance having a porous surface, and one that is chemically and physically resistant, i.e., for example, difficult to melt. Substances that fulfill these requirements can be of natural or synthetic origin. Aluminum oxides, such as γ-aluminum oxide or corundum, silicic acid gel, diatomaceous earth, lime, barium sulfate, magnesium, carbon black, titanium dioxide, iron oxide, zinc oxide, silicon carbide, alumina, silicates, pumice, kaolin, asbestos, zeolites, magnesia, individually or in admixture, can be used for this purpose. Depending upon the end use of the catalyst, these substances can be employed in the form of pellets, rings, cylinders, cubes, slivers, or pearl-shaped, both as bulk material or else as a monolithic catalyst carrier.

Depending upon the reaction that is to be catalyzed, one can employ a large surface catalyst carrier having a surface area of about 50 m²/g. A catalyst carrier having small surface area of about 5 m²/g and a correspondingly larger pore radii as well as a coarse granulate catalyst carrier can also be employed.

With all structural reinforcing agents one can count on a synergistic interaction between the reinforcing agent (catalyst carrier) and the active substance (coating or film). This is especially true the more uniform the mutual intermixing is. The limit between a structural and a synthetic reinforcing agent can, therefore, fluctuate. Synergistic reinforcing agents or promoters impart to the active substance (main component) an increased activity or a distinct selectivity in the direction of one of several thermodynamically possible reactions. Depending upon their material composition and on the nature of their effectiveness, they exhibit an extraordinarily complex picture.

A large number of elements and compounds are in use as the main components of catalysts. Elements of all groups of the periodic system (with the exception of the inert gases) are known for such use. A substance can even be catalytically active for several, very different processes; a general assignment of certain substances to certain reactions is not possible. For example, from Groups I, VI and VIII of the periodic system, the elements copper, silver, gold, chromium, tungsten, molybdenum, iron, cobalt, manganese, nickel, rhodium, platinum, palladium, rhenium, ruthenium, irridium can be employed. Zinc, aluminum, tin, zirconium, titanium, vanadium, tantalum and magnesium, from Groups II, III, IV, V and VII of the periodic system are examples of other metals that can be employed as catalytically active elements. Rare earths such as lanthanum, can also be employed.

Depending upon the intended use of the catalyst, these catalytically active elements can be employed in the bulk phase of the catalyst in metallic, oxidic or sulfidic form as well as in salt form. Typical examples of applications for the catalyst obtained from this invention are chemical reactions in liquid or gaseous phase, such as hydration, dehydration, oxidation, dehyratization, alkylation, or cyclization reactions.

Depending on the type and special character of the reaction that is to be catalyzed, a structural reinforcing agent can be coated with the main component and hardly any synergistic action of the catalyst carrier will result, i.e., the catalytic effect, in the case of the previously stated metals, can still be influenced by the characteristics of the bulk phase.

This type of catalyst can be employed in the production of a monolithic catalyst for purifying the exhaust gases from an internal combustion engine. There are other possible combinations whenever the main catalyst components are applied to a synergistic reinforcing agent, for example, $\gamma$-Al$_2$O$_3$, or whenever the synergistic reinforcing agent is applied to a structural reinforcer and the catalytically active elements are applied as a third layer, such as in the case of a spherical catalyst and the main component is applied as a film or coating. This would be possible, for example, with the combination of $\alpha$-Al$_2$O$_3$ (structural reinforcer) and $\gamma$-Al$_2$O$_3$ (synergistic reinforcer).

According to this invention, the catalyst carrier can be contacted with a combustible organic liquid during production of the catalytically active coating or film. Alcohols, ketones, ethers, esters and substituted and unsubstituted saturated and unsaturated aliphatic and aromatic hydrocarbons can be employed individually or in admixture for this purpose. Typical of such liquids are n-butenyl-ether, acetone, acetone oils, ethanol (spirit), ethylacetate, ethyliso-amylketone, ethyl butyrate, ethylene glycol-mono-acetate (glycol-mono-acetate), ethylene glycol-mono-ethyl ether (ethylglycol), ethylene glycol-mono-ethyl ether acetate (ethyl glycol acetate), ethylene glycol-mono-butyl ether (butyl glycol), ethylene glycol monobutyl ether acetate (butyl glycol acetate), ethylene glycol-mono-isopropyl ether (isopropyl glycol), ethylene glycol-mono-methyl ether (methyl glycol), ethylene-glycol-mono-methyl ether acetate (methyl glycol acetate), ethylene glycol-mono-propyl ether (propyl glycol), ethyl formiate, ethyl hexanol, ethyl propionate, amyl acetate, amyl alcohol, amyl butyrate, amyl formiate, benzene, benzyl acetate, benzyl alcohol, n-butanol, n-butyl acetate, n-butyl butyrate, 1,3-butylene glycol-(3)-mono-methyl ether (methoxy butanol), butylene glycol-(3)-mono-methyl ether-1-acetate (butoxyl), n-butyl formiate, n-butylpropionate, cyclohexane, cyclohexanol, cyclohexanol acetate, cyclohexanone (anon), cycloheptanone, cymene, decahydronaphthalene (dekalin*), diacetone alcohol, diethyl ether, di-iso-butyl ketone, dichloro ethane, di-methylcyclohexanone, dimethyl formamide, dimethyl sulfoxide, dioxane (diethylene dioxide), furfurol, glycol carbonate, glycolic acid butylester (GB-ester), hexylalcohol, isanol*, isobutanol, iso-butyl acetate, iso-butyl butyrate, iso-heptylacetate, iso-heptyl alcohol, iso-hexyl acetate, iso-hexyl alcohol, isophorone, isopropanol, isopropyl acetate, pine oil, benzene solutions (solvent naphta), mesityl oxide, methanol, methyl acetate, methylethyl ketone, methyl-isobutyl carbinol (2-methyl-4-pentanol), methyl-iso-butylketone, methyl cyclohexanol, methylcyclohexanol-acetate, methyl cyclohexanone (methylanone), methyl-cyclohexenone, methylene chloride, methyl formiate, lactic acid ethyl ester (ethyl-lactate), lactic acid butyl ester (butyl lactate), mono-chloro benzol, nonanol, polyethyleneglycol mono-ether, n-propanol, n-propylacetate, propylbutyrate, propylene glycol ether, propylene glycol carbonate, n-propyl propionate, carbon disulfide, boiling range benzenes, Solvenon M (technical dimethyl acetal), oil of turpentine, derivatives of oil of turpentine, test benzenes, tetrachloroethane, tetrahydrofuran (tetramethylene oxide), tetrahydronaphthalene (tetralin*), tetramethylene sulfone, toluene, trichloroethylene (tri), VMP-naphta, root oil of turpentine, and chloroform.

Water, alcohols, ketones, ethers, aldehydes and aromatic hydrocarbons can be employed individually or in admixture as solvents in which the catalytically active elements are dissolved. Furthermore, the organic liquids already mentioned above can also be employed. The mixing ratios can vary according to the catalyst reinforcer material and the catalystically active element and can be determind empirically.

In order that the combustibility of the organic liquid not be impaired, water, for example can only be added at such a maximum quantity, for example, to methanol, which still makes possible an ignition of the methanol.

The catalytically active elements can be present in the solvent as free ions or as ion complexes. Thus, complexes can be formed with chelating agents, such as acetylacetone, or by additions, such as ammonia. The use of complex halides, such as H$_2$PtCl$_6$, is of special interest.

Complexing, precipitating and/or reducing agents can be employed in the organic liquid. Thus, the organic liquid can be reacted, for example, with hydrogen sulfide, urotropine, ammonia, ammonium polysulfide or ammonium chloride. Hydrogen sulfide and ammonium polysulfide cause a fixation of the metals on the catalyst carrier surface, while ammonia and ammonium chloride bring about a slower diffusing-in of the metal salts because of the formation of a complex. Therefore, soluble substances can be added to the organic liquid, which convert the catalytically active elements into compounds with reduced solubility (fixation) or into compounds with reduced diffusion rate (complexing). Examples of other complexing agents are phosphates, especially pyrophosphates and metal phosphates; citrates; acetates; oxalates; tartrates; -o-phenanthrolene; thiocyanates; thiosulfates; thioureas; pyridine; quinoline; and cyano groups. Halogeno, for example, chloro; hydroxo; aquo and amino complexes can also be employed as complexing agents.

Olefin and olefin-like compounds, such as ethylene, propylene, butadiene, cyclohexene or styrene, can likewise be employed for the formation of complexes.

These complexes can be employed in non-aqueous systems, such as benzene, toluene, pyridine, acetone or diethyl ether.

Whenever platinum-group noble metals are employed as catalytically active elements, then a reducing agent can also be added to the organic liquid. Typical of such reducing agents are hydrazine, hydroxyl amine, glyoxal, formaldehyde, carbon monoxide and sulfur dioxide.

The secondary treatment reducing step can then be omitted.

Whenever a monolithic body of a catalyst carrier, i.e., a body of a catalyst carrier which consists of one piece and is used as such, is treated according to the process of this invention, then effectively the monolith is mixed with so much organic liquid that about 80% of the pores are filled. The remaining 20% of the pores are filled with the salt containing solvent.

The process of this invention has the advantage that the catalytically active coating covers the surface of the body of the catalyst carrier evenly. Independently of the size of the catalyst carrier employed, the layer formed is very thin because, as a result of the diffusion of the liquid from the inside, the catalytically active elements are retained on the surface of the carrier. Another advantage is the avoidance of losses of metal salt.

The process of the invention will be described and explained in more detail in the following Examples in which all parts, proportions, percentages and ratios are by weight unless otherwise indicated.

EXAMPLE 1

110 g of pellets of $\gamma$-$Al_2O_3$ (type Pechiney SCS 79 having a diameter of 2.8 mm to 4 mm) are rolled in a rotating enameled reaction container. During rolling, 60 ml of a solution of 22 g $H_2PtCl_6$ and 3 g $RhCl_3$ in 1 l of water are poured over these pellets. After drying them with a warm current of air, the pellets are treated with hydrogen for 1 hour at 500° C.

EXAMPLE 2

110 g of pellets of $\gamma$-$Al_2O_3$ (type Pechiney SCS 79 having a diameter of 2.8 mm to 4 mm) are rolled on an enameled circular plate, and saturated with methanol. Then 15 ml of a solution of 22 g $H_2PtCl_6$ and 3 g $RhCl_3$ in 1 l of water are added, and are intensively mixed with the saturated pellets. Subsequently, the methanol is ignited and completely burned, after which the pellets are treated with hydrogen for 1 hour at 500° C.

EXAMPLE 3

110 g of pellets of $\gamma$-$Al_2O_3$ (type Pechiney SCS 79 having a diameter of 2.8 mm to 4 mm), are rolled in an enameled circular plate, and saturated with cyclohexane. Then 15 ml of a solution of 22 g $H_2PtCl_6$ and 3 g $RhCl_3$ in 1 l of water are added and intensively mixed with the saturated pellets.

Subsequently, the cyclohexane is ignited and completely burned, after which the pellets are treated with hydrogen for 1 hour at 500° C.

EXAMPLE 4

110 g of pellets of $\gamma$-$Al_2O_3$ (type Pechiney SCS 79 having a diameter of 2.8 mm to 4 mm) are saturated in methanol while being rolled on an enameled circular plate with a cold-saturated solution of urotropine (hexamethylene tetraamine). 15 ml of a solution of 22 g $H_2PtCl_6$ and 3 g $RhCl_3$ in 1 l of water are added while rolling, and are mixed intensively with the saturated pellets. The mixture is ignited and completely burned. After that the pellets are treated with oxygen for 1 hour at 500° C.

EXAMPLE 5

110 g of pellets of $\gamma$-$Al_2O_3$ (type Pechiney SCS 79 having a diameter of 2.8 mm to 4 mm) are saturated with methanol while rolling on an enameled circular plate, and are subsequently wetted with 15 ml of a cold-saturated solution of urotropine (hexamethylene tetraamine). Then 15 ml of a solution of 22 g $H_2PtCl_6$ and 3 g $RhCl_3$ in 1 l of water are added and are mixed intensively with the saturated pellets. The mixture is ignited and burned. Then the pellets are treated with hydrogen for one hour at 500° C.

EXAMPLE 6

Pellets of $\gamma$-$Al_2O_3$ are tempered for 2 hours at 800° C., after which the specific surface is 43 $m^2/g$. 10 kg of the $\gamma$-$Al_2O_3$ pellets thus treated are saturated with 9 l of methanol in an enameled reaction container and rolled for 5 minutes for the purpose of homogenization. While rolling continues, 500 ml of an aqueous solution which contains 13.1 g of $H_2PtCl_6$, 4.6 g $RhCl_3$ and 26.0 g $AlCl_3.6H_2O$ are added. The pellets are rolled another 5 minutes for the purpose of homogenization.

The alcohol is ignited and burned while the bulk material is rolled. After extinguishing of the flame, the pellets are rolled for another 15 minutes, and subsequently after-treated with an $H_2$ stream for $\frac{1}{2}$ hour at 500° C.

The pellets of $\gamma$-$Al_2O_3$ (Rhone-Progil SCS 279) have a screening fraction between 2.38 mm and 4 mm whereby the bulk density is 0.7–0.72 kg/l.

EXAMPLE 7

A cylindrical, monolithic carrier body of the type EX 20 (firm of Corning Glass) having a 100 mm diameter and a length of 150 mm is provided with a coating of active alumina corresponding to German DOS No. 23 06 395.8. The carrier body then had a specific surface of 13 $m^2/g$.

The activated body is dipped into methanol, the excess methanol is blown out of the channels with compressed air and was weighed. The body absorbed 113 g of methanol (wet weight). Subsequently, the body is dried to 70% of its wet weight. The body is then dipped into an aqueous methanol solution (92% methanol), which contains per liter, 23.8 g of Pd as $PdCl_2$, 57.4 g Cu $(NO_3)_2.3H_2O$, 47.6 g $CrO_3$ and 61.9 g aluminum cetyl acetonate $Al(C_5H_7O_2)_3$. The methanol is burned away, the carrier body is calcined subsequently in air at 400° C. during 0.5 h, and is then after-treated in a $H_2$ current for 15 minutes at 200° C.

EXAMPLE 8

11 kg of pellets of $\gamma$-$Al_2O_3$ (type SCS 79 of the firm Pechiney, fraction 2.8 mm to 4.0 mm) were saturated according to Example 1 in a circular shelve with 6 l carbon tetrachloride ($CCl_4$). Then 1000 l of an aqueous methanol solution (methanol 40% by weight), which contained 22 g Pd as $PdCl_2$, are added and dried in a hot air current (200° C.) and subsequently treated in a hydrogen current (40 l/h) for 1 hour at 500° C.

EXAMPLE 9

A cylindrical monolithic carrier body of the type AlSiMag 7.95 (American Lava) having a 100 mm diameter and a length of 75 mm is provided with a coating of active alumina in the manner described in Example 7. The carrier body then had a specific surface of 20 $m^2/g$.

The carrier body thus pre-treated is dipped in acetone, and the channels subsequently blow open with compressed air. Then the body is dried to about 65% of its original acetone absorption (wet weight) and dipped into acetic acid ethyl ester, which contained 21.8 g Pt as $PtCl_4$ and 143.5 g $CrO_3$ per liter. The carrier body is calcined during 1 hour at 600° C. in air and treated further. The catalyst contained 0.5 g Pt and 2.5 g $Cr_2O_3$.

EXAMPLE 10

1 kg of an extruded material (diameter 3 mm, length 3-9 mm) of active alumina (type VHA 300 T) is saturated with 0.75 liters of carbon tetrachloride ($CCl_4$) in a vacuum (20 mm Hg) after homogenization (10 minutes). After this and while rolling, 100 ml of an aqueous methanol solution (95% $CH_3OH$), which contained 13.15 g $CrO_3$, are added and filled into a vacuum-rotary evaporator and evaporated while rolling at 80° C. oil bath temperature. Then, the material is calcined in air at 400° C. during 0.5 hours.

EXAMPLE 11

11,000 g of spherical catalyst carriers of the type Pechiney SCS 250—diameter of the sphere 2.8 mm to 4 mm—are saturated in an enameled reaction container with 8 l of an aqueous ammoniacal methanol solution (6.3% $NH_3$). Then, 100 ml of a methanol solution which contains 22 g Pt as $H_2PtCl_6$, are added and are after-treated as described in Example 8.

EXAMPLE 12

10 kg of a pelleted, active aluminum oxide (type HA 300 T)—size of the pellets 3×3 mm—are saturated while rolling them in a reaction container with 8 l of a formaldehyde-containing methanol solution (8.75% $CH_2O$). Then 1000 ml of an aqueous methanol solution (95% methanol), which contains 40 g Pd as Pd-II-chloride, are added and treatment is continued as previously described in Example 1.

In order to evaluate the depth of penetration of the catalytically active coating and thus the requirement for salts of noble metals, the cross-section of a treated pellet is enlarged photographically a hundred fold. The width of the darkly colored edge is measured.

| Example | Width of Edge[+] | Reality | |
| --- | --- | --- | --- |
| 1 | 3.5 to 4 cm | 0.35 to 0.4 mm | The border is not sharply defined on the inside. |
| 2 | 2 to 2.5 cm | 0.2 to 0.25 mm | |
| 3 | 3 cm | 0.3 mm | |
| 4 | 0.5 to 1 cm | 0.05 to 0.1 mm | The border is sharply defined on the inside. |
| 5 | 0.5 to 1 cm | 0.05 to 0.1 mm | |
| 6 | 2 to 2.5 cm | 0.2 to 0.25 mm. | |

[+]On photographic picture

What is claimed is:

1. In a process of making a catalyst wherein a coating of at least one catalytically active element is applied to the external surfaces of a porous catalyst carrier having a large surface area from a solution of said at least one catalytically active element, and wherein said catalyst carrier is contacted with an organic liquid prior to applying the coating of at least one catalytically active element to said catalyst carrier and wherein the saturation of said catalyst carrier is not exceeded by contacting with said organic liquid; the improvement which comprises adding a solution of a complexing, precipitating or reducing agent for said catalytically active element to said organic liquid.

2. In the process according to claim 1 in which said organic liquid is combustible and said liquid is removed by burning, wherein the amount of solvent in said solution of said at least one catalytically active element does not substantially impair the combustibility of said organic liquid.

3. In the process according to claim 2 wherein an organic solvent solution of a complexing agent for said catalytically active element is added to the organic liquid which is used to contact said carrier.

4. In the process according to claim 2 wherein a solution of a precipitating agent for said catalytically active element in a second organic liquid is added to said organic liquid.

5. In the process according to claim 2 wherein a solution of a reducing agent for said catalytically active element in a second organic liquid is added to said organic liquid.

6. In the process according to claim 2 in which the catalyst carrier is subjected to an after-treatment after said removal of said liquid.

7. In the process according to claim 6 wherein said after-treatment comprises treating said catalyst carrier with a reducing agent for said catalytically active element.

8. In the process according to claim 6 wherein said after-treatment comprises tempering said catalyst carrier at an elevated temperature.

* * * * *